United States Patent [19]

Servel et al.

[11] Patent Number: 4,884,264

[45] Date of Patent: Nov. 28, 1989

[54] HYBRID TIME MULTIPLEX SWITCHING SYSTEM WITH OPTIMIZED BUFFER MEMORY

[75] Inventors: Michel Servel, Lannion; Patrick Gonet, Trelevern; Jo',uml/e/ l Francois, Perros Guirec, all of France

[73] Assignee: Etat Francais Represente Par Le Ministre Des PTT (Centre National D'Etudes Des Telecommunications, Issy-Les-Moulineaux, France

[21] Appl. No.: 223,692

[22] Filed: Jul. 22, 1988

[30] Foreign Application Priority Data

Jul. 24, 1987 [FR] France .................. 87-10034

[51] Int. Cl.⁴ .............................................. H04J 3/26
[52] U.S. Cl. ......................................... 370/58.1; 370/60; 370/94.1
[58] Field of Search ......................... 370/60, 58, 94

[56] References Cited

U.S. PATENT DOCUMENTS

| | | | |
|---|---|---|---|
| 3,988,545 | 10/1976 | Kuemmerle et al. | 370/60 |
| 4,603,416 | 7/1986 | Servel et al. | 370/60 |
| 4,611,321 | 9/1986 | Gabrielli et al. | 370/60 |
| 4,612,636 | 9/1986 | Grover et al. | 370/94 |
| 4,674,033 | 6/1987 | Miller | 370/94 |
| 4,707,826 | 11/1987 | Froggatt | 370/60 |

FOREIGN PATENT DOCUMENTS

0113307 12/1983 European Pat. Off. .
8702892 2/1987 France .

Primary Examiner—Douglas W. Olms
Assistant Examiner—Min Jung
Attorney, Agent, or Firm—Lowe, Price, LeBlanc, Becker & Shur

[57] ABSTRACT

A switching system for switching synchronous and/or synchronous data blocks between incoming and outgoing multiplexes. The asynchronous blocks are sporadically carried in the multiplexes. The cost of the system is reduced owing to the use of a single buffer memory whose cells memorize indifferently synchronous and asynchronous blocks. The number of cells is lower than the product of the number of incoming or outgoing multiplexes and the number of blocks per frame in the multiplexes. A buffer memory managing and write addressing circuit derives and memorizes the occupied or free condition of each of the buffer memory cells thereby permanently selecting the address of one of free buffer cells in which a data block is to be written. The occupied condition of a cell is signalled responsive to the write of an incoming data block into this cell, and the free condition of the cell is signalled responsive to the last read of the written block. A written block may be read several times when it should be transmitted onto several addressee outgoing multiplexes.

9 Claims, 5 Drawing Sheets

HYBRID TIME MULTIPLEX SWITCHING SYSTEM WITH OPTIMIZED BUFFER MEMORY

FIELD OF THE INVENTION

The present invention relates to a system for switching data blocks between several incoming time-division multiplex ways and several outgoing time-division multiplex ways.

The blocks in each of the multiplex ways may be synchronous circuit-mode blocks and/or asynchronous packet-mode blocks and are of a constant length. The synchronous blocks in a particular communication are transmitted periodically, at a frame frequency of the multiplex ways. Asynchronous blocks in the particular communication are transmitted sporadically in the multiplex ways. The blocks result from prior octet packetization for both circuit-mode and packet-mode communications.

DESCRIPTION OF THE PRIOR ART

At an input to such a switching system, the data blocks in the incoming multiplex ways are detected and are multiplexed in an incoming supermultiplex. Switching is independent of the actual data content in the blocks.

When the multiplex ways carry only synchronous blocks or only asynchronous blocks as described in the U.S. Pat. No. 4,603,416, issued July 29, 1986, the detected and multiplexed blocks are written in a single buffer memory as and when they arrive, and are read contingent on ranks of time intervals in addressee outgoing multiplex ways and/or ranks of addressee outgoing multiplex ways into which the blocks are to be routed respectively.

When the multiplex ways carry both synchronous blocks and asynchronous blocks, as described in the French patent application No. 87-02892 filed Feb. 27, 1987, (not yet published and corresponding to U.S. patent application No. 07/153,248 filed Feb. 08, 1988) in the names of J. FRANCOIS, J. P. QUINQUIS and M. SERVEL, both the synchronous blocks and the asynchronous blocks in the supermultiplex are written progressively with their arrival into first and second buffer memories. The choice between synchronous blocks and asynchronous blocks is made as the blocks are read out of the buffer memories. The synchronous blocks are read-out from the first buffer memory contingent on the addressee periodic time intervals in the outgoing multiplex ways to be occupied, and the asynchronous blocks are read-out from the second buffer memory contingent on the time intervals remaining unoccupied by the synchronous blocks in the outgoing multiplex ways.

Whatever the type of switching system, the addresses of buffer memory cells where detected blocks should be written are supplied cyclically by a time base, as with a buffer memory in a PCM time-division switching system. Thus, for example, for three detected data blocks respectively spaced apart by two empty data blocks, referred to as blank blocks or slots and by five entry blocks in the incoming supermultiplex, the first data block is written in a buffer memory cell having an address k, where k is an integer between 1 and the number of block cells of the buffer memory, the second data block is written in a cell having address k+3, and the third data block is written in a cell having address k+9. Intermediate cells having addresses k+1, k+2 and k+4 to k+8 remain unoccupied and can only be occupied in the next addressing cycle if data blocks are supplied from the incoming supermultiplex at the same time as these cells are write addressed respectively.

This cyclic write addressing of a buffer memory basically has the following drawbacks.

Because the data blocks to be written are distributed sporadically, the number of unoccupied cells in the buffer memory is relatively large on average. For a system which only switches asynchronous blocks, the capacity of the buffer memory does not depend on the average rate of detected blocks supplied from the supermultiplex, but on the greater average rate of the blocks in the incoming and outgoing multiplex ways, so as to lose, where applicable, a minimum number of data blocks. For a hybrid system switching both synchronous and asynchronous blocks, the capacity of each of the two buffer memories is at least equal to the product of the number of time intervals in a multiplex frame and the number of incoming or outgoing multiplex ways, i.e., at least equal to the number of time intervals in a frame of the supermultiplex, so as to enable periodic writing of the synchronous blocks in a same communication.

Moreover, in a hybrid switching system, the average number of unoccupied cells is multiplied by two because two buffer memories are used.

Consequently, the cost of the switching system depends directly on the buffer memory, and hence on the capacity thereof.

Object of the Invention

The main object of this invention is to reduce the buffer memory capacity in a data block switching system, notably of the asynchronous or hybrid type. Accessorily, with this reduction, it is possible to integrate the buffer memory with input means multiplexing the blocks of the incoming multiplex ways and output means multiplexing the blocks read in buffer memory and transmitted into the outgoing multiplex ways.

Summary of the Invention

In accordance with the present invention, a system for switching data blocks between a plurality of incoming multiplex ways and a plurality of outgoing multiplex ways, wherein each of said blocks in said incoming ways is intended for at least one addressee of said outgoing ways, comprises input means (CE, MRE) for detecting data blocks in said incoming multiplex ways to multiplex detected blocks into multiplexed blocks, in combination with buffer means comprising block cells for memorizing said multiplexed blocks, write addressing means (MCE, MTR, CPE) that derive write addresses of block cells for writing said multiplexed blocks in block cells in accordance with the derived write addresses, read addressing means (CAL) for arranging the addresses of the write addressed block cells dependent on addressee outgoing multiplex ways for which the written blocks are intended to cyclically read the written blocks into read blocks in accordance with the arranged block cell addresses, and means (CRT, MRS, p/s) for demultiplexing said read blocks and transmitting them onto said addressee outgoing multiplex ways.

The write addressing means comprises means (MAD) for selecting any one of the block cells which are free in said buffer means responsive to any data block being detected to thereby provide a free cell address to write said detected block in said buffer means, said free cell address being selected contingent on block cell addresses which are supplied from said read addressing means to said selecting means when memorized blocks are read.

Thus, according to the invention, a buffer means cell in which a data block is to be written is not write addressed cyclically but is chosen from the buffer means cells which are free while the block is written into the block cell memory write. The selecting means monitors permanently the busy or free condition of all the buffer means cells so as to continuously offer a free cell address for a block to be written. The free cell address is replaced by an address of another free cell after the block has been written into the block cell memory. The cell now occupied by the written block is then released the first time the block is read for a point-to-point communication, or the last time the block is read for a multipoint communication. The released cell can be immediately re-used so another incoming block can be written into it without waiting for a time base to produce the address of the released cell after a complete buffer means addressing cycle. This is in contrast to the prior art where such waiting occurs.

In these conditions, the capacity of the buffer means depends directly on the average rate of the data blocks in the incoming supermultiplex. Referring to the previously-mentioned example, if the cells having addresses k to k+9 are selected in increasing order of addresses, the cells having the addresses k, k+1 and k+2 memorize said first, second and third detected data blocks. If amongst the cells with addresses 1 to k+1, only the cells having the addresses k and k+1 are released before a fourth data block is supplied from the incoming supermultiplex, this fourth block is written in the cell having address k.

According to an aspect of the invention, a switching system is designed to switch data blocks also relating to multipoint communications. With a multipoint communication, a data block is read as many times as there are addressee outgoing multiplex ways that are to receive the data block. A cell of the buffer means in which the data block is written is released when the last block is read, i.e., after nbm reads, where nmb denotes the number of addressee outgoing multiplex ways.

For this purpose, the write addressing means comprises means for indicating the numbers of outgoing multiplex ways to which data blocks memorized in buffer means cells are still to be transmitted, respectively. The number relating to a cell memorizing a block is equal to a predetermined number of addressee outgoing multiplex ways for the block when the block is written in the cell. The number is decremented by one in response to each read address of each cell supplied from the read addressing means. The fact that the cell that memorized said block has been released is signalled by the indicating means to the selecting means as soon as said number reaches zero.

According to a preferred embodiment described in detail in the remainder of the description herein, a hybrid type switching system comprises, as according to the aforesaid French patent application No. 87-02892:

input means for (a) detecting said data blocks in said frames of said incoming multiplex ways and (b) multiplexing detected data blocks into detected and multiplexed blocks, first buffer means for memorizing the detected and multiplexed blocks in first block cells, second buffer means for memorizing the detected and multiplexed blocks in second block cells, output means for (a) multiplexing synchronous and asynchronous blocks memorized in the first and second buffer means and (b) transmitting them contingent on their designations to the outgoing multiplex ways thereby forming the frames in the outgoing multiplex ways, write means for deriving block cell addresses thereby writing each of the detected and multiplexed blocks in the first and second cells, first read means receiving the addresses of the first cells in which are written the synchronous blocks for reading each of the memorized synchronous blocks, by correspondence between the address of the first cell in which the synchronous block is written and at least an identification number of an outgoing multiplex time interval to be occupied by the synchronous block, and several second read means respectively assigned to the outgoing multiplex ways and addressed by the write means, and receiving the addresses of the second cells in which are written and memorized asynchronous blocks for reading each of the memorized asynchronous blocks, by correspondence between the address of the second cell in which said asynchronous block is written and the identification number of the addresses outgoing multiplex way.

According to the invention, in this hybrid switching system, first and second buffer means include a signal buffer memory having block cells capable of indifferently memorizing synchronous blocks and asynchronous blocks that have been detected and multiplexed, and the write means comprises means for selecting a write address of one of the block cells of the buffer memory which is free when a data block has been detected thereby writing this detected block in the free selected cell; a free cell address selection is established contingent on block cell addresses which are supplied from the first and second read means when memorized synchronous and asynchronous block are read in the buffer memory respectively.

Thus, a hybrid switching system embodying the invention comprises a buffer memory having a capacity less than half the set of two buffer memories according to the French patent application No. 87-02892. This considerably reduces the cost of the switching system.

The cost is further reduced when the single buffer memory can be integrated notably with input and output rotation matrixes included respectively in the input and output means. It is recalled that these rotation matrices that produce simultaneous block octet permutations offer the advantage of processing data blocks of multiplex ways with very high bit rates, notably for video communications. This bit rate is considerably greater than those of conventional serial-to-parallel and parallel-to-serial conversion multiplexing and demultiplexing means.

The reduction in the capacity of the buffer memory solves interconnection overload problems inside the system, and because of integration, optimizes the operating speeds, notably concerning writing into and reading out of buffer memory cells.

BRIEF DESCRIPTION OF THE DRAWINGS

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

Figure 1:
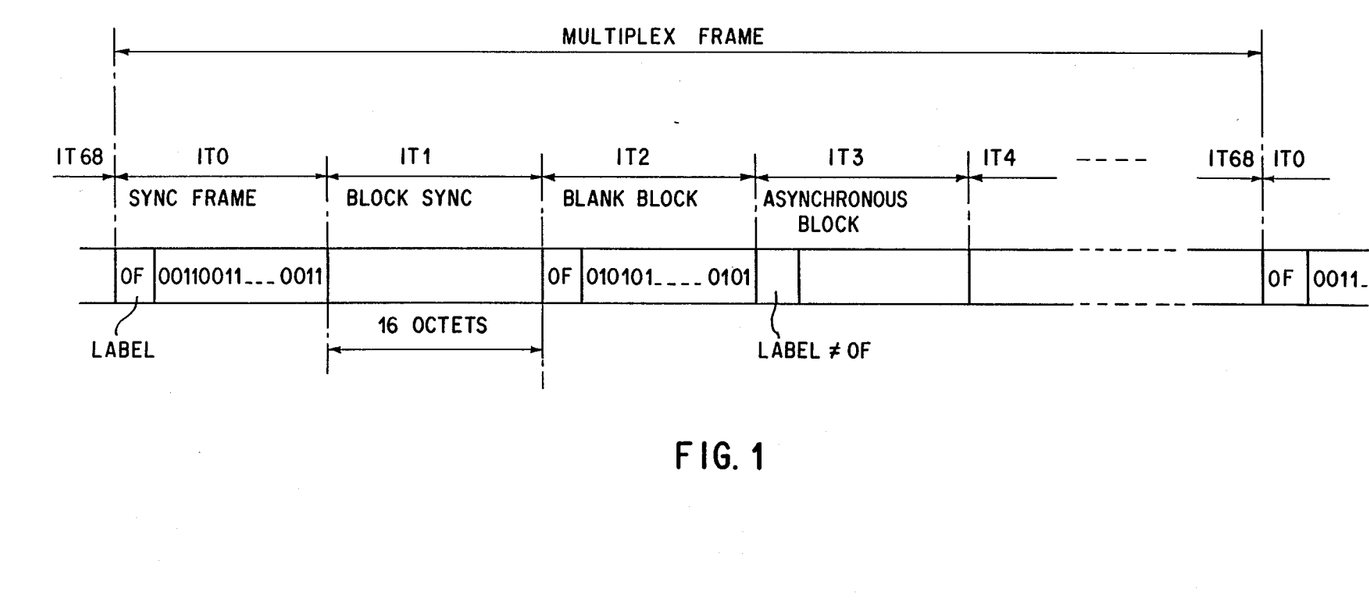
FIG. 1 is a diagram of a hybrid frame of an incoming or outgoing multiplex way.

An incoming or outgoing time multiplexed signal in the switching system embodying the invention has a frame structure such as shown in FIG. 1, which is referred to in the remainder of the specification. The multiplexed frame carries 16-octet blocks occupying consecutive time intervals. For example, when the multiplexed frame has a rate of 280 Mbit/s, an octet block is transmitted during 0.457 μs, corresponding to an octet period of 28.57 ns.

In practice, the multiplexed frame is a hybrid. A hybrid frame includes both synchronous and asynchronous data blocks; the synchronous data blocks are derived, e.g., from circuit-mode transmmission channels carrying speech while asynchronous data blocks are derived, e.g., from packet-mode transmission channels. By definition, the synchronous blocks occupy time intervals having predetermined ranks in the frame, such as a second interval IT1, whereas the asynchronous blocks, so-called packet blocks, occupy, in a practically sporadic fashion, the other time intervals in the frame, such as intervals IT2, IT3. Moreover, several asynchronous blocks in the same communication or message to be retransmitted in one or several outgoing multiplexed ways can be contained in the same frame, some consecutively, others time spaced. Hence certain asynchronous blocks in a frame might have no data and are subsequently called "blank blocks". Blank blocks nevertheless have a predetermined bit pattern which cannot be imitated in the packet blocks so as to serve as packet synchronization.

According to the frame structure illustrated in FIG. 1, a frame contains 69 16-octet blocks occupying time intervals IT0 to IT68; any other frame size may be employed, e.g., a mayhave 64, 65, . . . 72 blocks, which may differ from a power of 2. A first frame interval IT0 contains a frame synchronization block, also known as a frame alignment or framing block or word, having the following pattern: 0000111100110011 . . . 00110011. Furthermore it is possible to assign only a part, for example one half, first interval IT0 to the alignment pattern 000011110011 . . . 0011, and another part of the frame may be assigned to other information. A blank so-called packet synchronous block, such as that of interval IT2, has the following pattern 00001111101010101 . . 01010101, in which the first octet is identical to that of the frame synchronization block corresponding to "OF" in hexadecimal code and forms a synchronization label followed by pairs of filling bits "01". An asynchronous block, such as at interval IT3, contains a first octet forming a label of the block and 15 data octets. The label of an asynchronous block constitutes an identifier of a packet communication in which a predetermined number of bits are assigned to identification of the multiplex frame and to the identification of transmission channels outgoing from the switching system and possibly other subsequent secondary switching systems. Thus, the asynchronous blocks in the same communication have a same specific label which is substitued for any other label when switching in the switching system, thereby routing the block to another main or secondary switching system.

Figure 2:
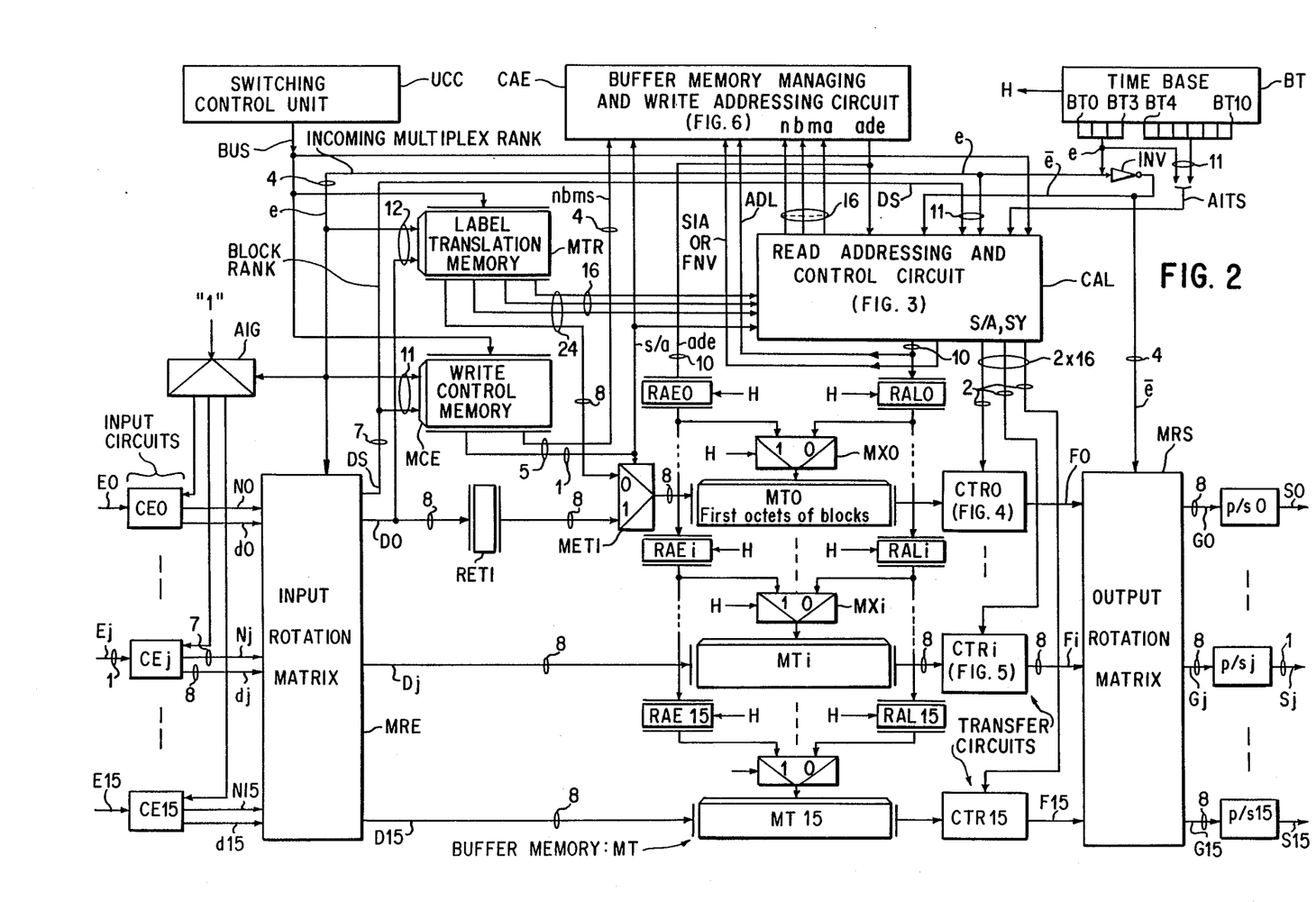
FIG. 2 is a block-diagram of a hybrid switching system embodying the invention.

As shown in FIG. 2, the hybrid switching system is designed to switch data blocks from sixteen incoming multiplex ways E0 to E15 to sixteen outgoing multiplex ways S0 to S15. The system basically includes, input and output circuitry from primary buffer memory MT. The input circuitry includes 16 input circuits CE0 to CE15 and an input rotation matrix MRE, while the output circuitry includes 16 transfer circuits CTR0 to CTR15, an output rotation matrix MRS and 16 parallel-to-serial converters p/s0 to p/s15 firstly, and means for ensuring writing and reading of packets in the buffer memory according to the communications requested, such as a write control memory MCE, a label translation memory MTR, a read addressing and control circuit CAL, and a buffer memory managing and write addressing circuit CAE, secondly.

The switching system also comprises a time base BT including a local clock with a frequency that is an integral multiple of the multiplex rate. In particular, the time base BT contains frequency dividers and counters to produce; (a) on a first output, a clock signal H at the octet frequency in the multiplex ways; (b) on four outputs BT0 to BT3, 4-bit multiplex address words e every 16 periods of the signal H; (c) through an inverter circuit INV, a word $\bar{e}$ that is the complement of e; and (d) on outputs BT0 to BT3 and seven other outputs BT4 to BT10 an outgoing time interval address word AITS with 11 bits. The words e and AITS are transmitted at the octet frequency H. The time base operates on a frame cycle of 69×16=1104 time intervals corresponding to the multiplexing of 16 multiplex ways, at a rate of 69 incoming time intervals or blocks per multiplex frame and per frame period, so as to form read addresses of a first read control memory MCL1, which is designed for the read control of data blocks written in the buffer memory, as seen infra. The words e and $\bar{e}$ vary successively from 0 to 15 and from 15 to 0 and form addresses of the incoming and outgoing multiplex ways respectively. The words AITS vary from 0 to 1103.

The basic task of the input circuits CE0 to CE15 is to synchronize the frames in the incoming multiplexed ways E0 to E15 before they are synchronously multiplexed. In fact, the labels in the data blocks of the incoming multiplex ways are not a priori applied simultaneously on input to circuits CE0 to CE15. Such synchronization is completed with that of the asynchronous blocks, i.e., by their alignment subsequent to sporadic detections of blank blocks. Moreover, circuits CE0 to CE15 are designed to produce to 7-bit rank numbers of the blocks in each of the frames of each incoming multiplex by detecting the frame synchronization blocks, and to extract from the frames the blank blocks which are not derived at the output from the input circuits.

Each of the input circuits CE0 to CE15 is similar to that described and shown in FIG. 4 in the French patent application No. 87-02892 referred to supra. One input circuit chiefly comprises a frame control and synchronous circuit shown in FIG. 5 in the aforesaid application to signal the start of each block, indicate the block ranks in the frames and recover an octet frequency, and a serial-to-parallel converter, a queue FIFO and a logic queue addressing circuit, as described in detail in U.S. Pat. No. 4,603,416 or European Pat. No. 0,113,307. Thus each input circuit CE0 to CE15 includes a queue of words with $8+7+1=16$ parallel bits, each word queue includes an octet, a packet rank number when the octet is a first packet octet, and a block start indication bit. The data octets and packet ranks are transmitted by circuits CE0 to CE15 to matrix MRE through 8-wire buses d0 to d15 and 7-wire buses N0 to N15, respectively. Nevertheless, a according to patent application No. 87-02892, or according to FIG. 5 of U.S. Pat. No. 4,603,416, the octets with the same rank in the frames of buses d0 to d15 are delivered sequentially at the rate of the octet clock H; in particular this shift resulting from a parallel-diagonal conversion, so-called "paragonal" conversion, requires that the labels be shifted from a bus d0 to d15 to the next bus d1 to d15, d0, with a duration equal to that of the octet period. This shift is obtained via a cyclic selection circuit AIG, such as a demultiplexer having an input to state "1", which receives the words e supplied by the time base BT and derives signals having the frequency of the blocks and delayed successively by an octet period.

Rotation matrixes MRE and MRS have a similar function to those described in French patent application No. 87-02982 or U.S. Pat. No. 4,603,416. Rotation matrixes MRE and MRS have rotation control inputs to which are applied the words e and $\bar{e}$ that vary cyclically from 0 to 15 and from 15 to 0 and which implicitly identify the ranks of the incoming and outgoing multiplex ways, respectively.

In the matrix MRE, the rotation takes place for $8+7=15$ bits so as to transmit firstly, on a first 7-wire output bus DS, the block ranks in synchronism with the first octets of the multiplexed blocks that are transmitted by a second 8-wire bus D0; and secondly, the 16 octets of each block on sixteen 8-wire buses D0 to D15 forming an incoming supermultiplex connected to the buffer memory. If i denotes the rank of an octet in a packet block, and j the rank of an incoming multiplex way, where i and j are integers lying between 0 and 15, then the octet with rank i in a block delivered from the bus dj is transmitted by the bus Di and follows the octet having rank i-1 in this same block and transmitted by the output bus D(i-1), after one octet period of signal H. All the octets with rank i in blocks of the same rank in the time shifted frames of buses d0 to d15 are transmitted by bus Di, so the octet on bus dj follows the octet on bus d(j-1). As will be seen subsequently, the output rotation matrix performs the reverse operation so as to "de-diagonalize" the blocks outgoing from the buffer memory.

The buffer memory MT contains 16 buffer sub-memories MT0 to MT15. Bus D0 is linked to 8 first inputs of a label multiplexer MET1 through an 8-parallel-stage label register RETI. Eight outputs from the multiplexer METI apply first octets to data inputs of the first buffer sub-memory MT0. The first memorized octets are first octets of synchronous blocks coming directly from bus D0 and new labels of asynchronous blocks read-out in the translation memory MTR. The register RETI compensates for the label translation time when a synchronous block is to be written in buffer memory MT. The other output buses D1 to D15 of matrix MRE are linked directly to data inputs of sub-memories MT1 to MT15 respectively.

As is shown in FIG. 2, associated with each of sub-memories MT0 to MT15 are a write address register RAE0 to RAE15, a read address register RAL0 to RAL15, and an address multiplexer MX0 to MX15 (linked to outputs of the two latter registers) for transmitting the write and read addresses to the sub-memory at the rhythm of clock H. Registers RAE0 to RAE15 are series-connected to a free cell write address bus ade from circuit CAE. Nevertheless, to preserve the delay due to register RTI, the first two octets of each block are simultaneously written so that the output of register RAE0 is connected directly to the input of register RAE2, register RAE1 being inexistent. Likewise, registers RAL0 to RAL15 are series-connected to a block read address bus ADL from circuit CAL. All the previous registers receive the octet signal H so as to write or read the octets in the same data block during sixteen successive octet periods, in accordance with the "paragonal" shift of the block octets in buses D0 to D15 of the incoming supermultiplex. Addressing the sub-memories for write and read operations is deduced in the same way, dependent on a write address ade and a read address ADL respectively. Thus, although the incoming blocks in the buffer memory are presented in diagonal form, they are nevertheless written in orthogonal space form in the sub-memories.

The buffer sub-memories MT0 to MT15 respectively memorize the sixteen octets of a data block. Because a 1-octet sub-cell in each of the sub-memories, i.e., a 16-sub-cell cell in memory MT is dynamically selected, and a cell that has just been released can be immediately re-used to write another incoming block, it suffices that the memory MT is dimensioned to have 64 blocks per frame; by multiplexing there is a very low probability of block loss due to undersizing of memory MT. Thus, each of the sub-memories MT0 to MT15 contains $64 \times 16 = 1024$ 1-octet cells, a number which is substantially lower than the 1104 of blocks per frame.

The eight data outputs of each of the buffer sub-memories MT0 to MT15 are linked to a respective 8-wire input bus F0 to F15 of the output rotation matrix MRS via respective transfer circuits CTR0 to CTR15. The transfer circuits are each linked to two output wires of circuit CAL transmitting S/A and SY signals designed to enter frame synchronization blocks and blank blocks into the outgoing multiplex ways. Eight-wire output buses G0 to G15 from matrix MRS transmit data blocks for to (incoming or outgoing) multiplex ways S0 to S15 via parallel-to-serial converters p/s0 to p/s15 respectively. The data blocks in the different buses G0 to G15 have labels shifted by one octet period from one bus to the next, as in input buses d0 to d15.

The block and label write control means MCE+MTR and circuit CAL are now described. Control means MCET, MTR and CRT-CAL have structures substantially similar to those described in the French patent application No. 87-02892; however, the structures differ from those of the application in the manner that they are connected with the links and interdependent functions for buffer-memory management and write addressing circuit CAE.

As illustrated in FIG. 2, a switching control unit UCC is linked by a bus BUS to data and write addressing inputs of memories MCE and MTR and the first memory MCL1, the latter being included in circuit CAL. The switching control unit UCC monitors the circuit-mode and packet-mode communications running through the switching system, as a function of signalling blocks detected in the incoming multiplex ways and identified by specific labels. Contingent on further communications to be set up or communications to be released, unit UCC modifies the content of the three memories MTR, MCE and MCL1. Memories MCE and MCL1, together with a second memory MCL2 that is included in circuit CAL, are RAM memories. Each of memories MCE and MCL1 contains addressable a number of cells at least equal to the number of data blocks per frame in the multiplex ways, i.e., at least $69 \times 16 = 1104$ cells. Secondly, the memory MTR contains as many cells as there are virtual circuits addressable by the various labels, i.e., for sixteen multiplex ways and one 8-bit label, $16 \times 2^8 = 4096$ cells. Each of the cells in memories MCE, MTR and MCL1 contains $4+1=5$ bits, $16+8=24$ bits, $11+2=13$ bits respectively.

The write control memory MCE is read addressed by 11-bit addresses each comprising a first 4-bit part formed by a word e identifying the rank of an incoming multiplex way and provided from time base BT, and a second 7-bit part formed by the rank of a block in a frame of the incoming multiplex way and delivered by bus DS of matrix MRE. Each cell in memory MCE contains one bit s/a indicating whether the block to be written in buffer memory is assigned to a synchronous communication (s) to which s/a="1", or to an asynchronous communication (a) for which s/a="0", together with four significant bits indicating the binary code number nbms of outgoing multiplex ways S0 to S15 in which the block to be written should be transmitted when the communication is synchronous. It is observed that reciprocally, blocks from several incoming multiplex ways E0 to E15 can be transmitted in the same outgoing multiplex, way according to the principles of multipoint communication. Thus, for example, if a synchronous block is to be transmitted to three outgoing multiplex ways such as multiplex ways S1, S4 and S9, the number nbms indicates the value 3="0011".

Figure 6:
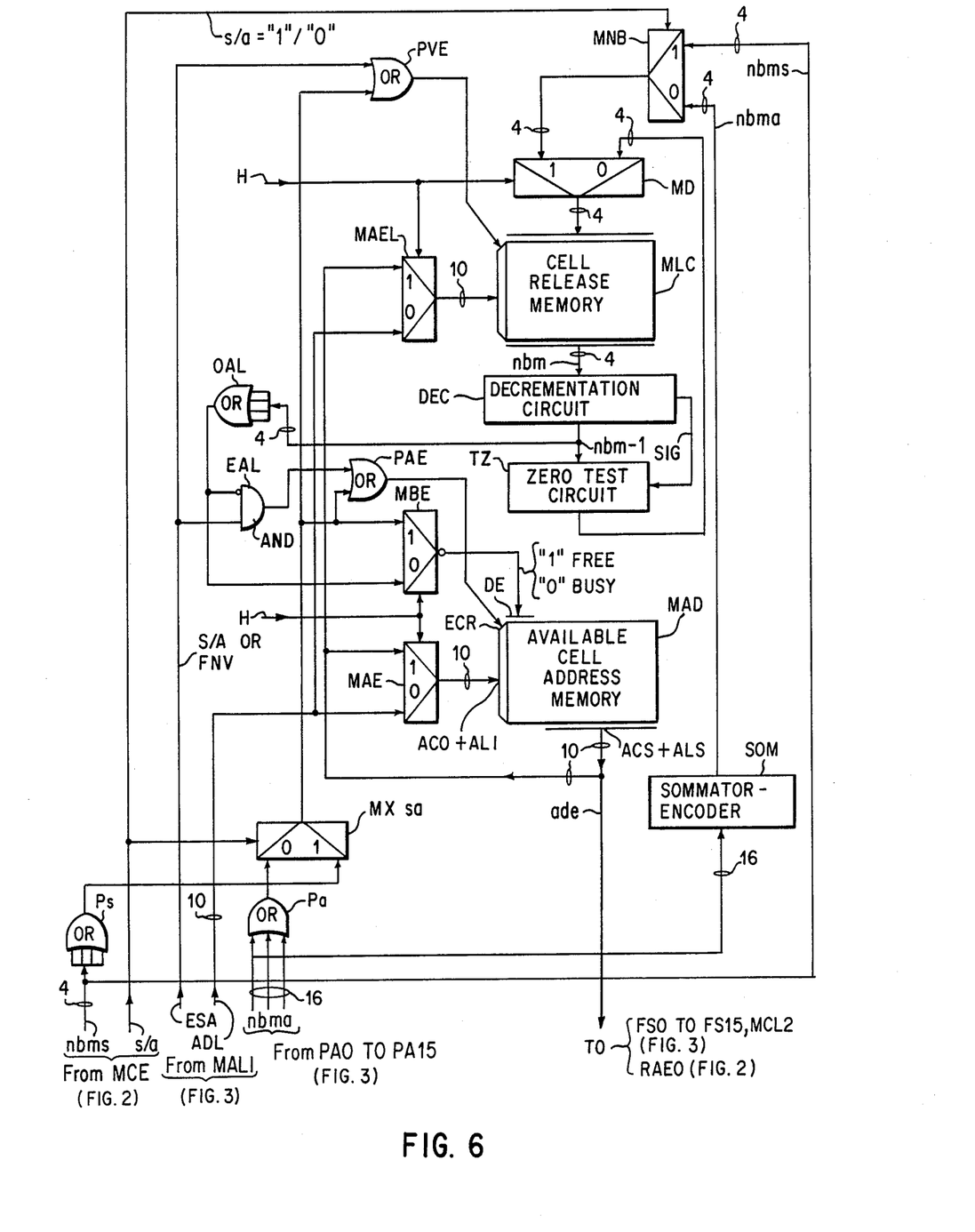
FIG. 6 is a detailed block-diagram of a buffer memory managing and write addressing circuit included in the hybrid system.

The parallel bits of the number nbms read in memory MCE are applied to the four inputs of an OR gate Ps, having an output linked to a first input of a multiplexer MXsa, and to four first inputs of a multiplexer MNB, members Ps, MXsa and MNB being included in circuit CAE shown in FIG. 6. Bit s/a is applied firstly, to a selection input of multiplexer METI thereby transmitting a new label for an asynchronous block read in memory MTR when s/a="0" and, secondly, to a write control input of a second read control memory MCL2 and to inverting control inputs of sixteen 2-input AND gates PA0 to PA15 included in circuit CAL (FIG. 3), and to the selection inputs of multiplexers MXsa and MNB that are included in circuit CAE (FIG. 6).

Translation memory MTR is loaded with a new label to be assigned to the asynchronous blocks of a communication by unit UCC, when setting up this communication. This new label is read by a 12-bit address comprising a first 4-bit part formed by a word e identifying the rank of the incoming multiplex way carrying the blocks of this asynchronous communication, and a second 8-bit part comprising the label of these blocks transmitted by output bus D0 from input rotation matrix MRE. In practice, each cell of memory MTR comprises a new 8-bit label to be applied to the second inputs of multiplexer METI for insertion as a header in the blocks of the communication, and a 16-bit word including only one or several bits at high state "1", the ranks in the 16-bit word correspond to the ranks of the outgoing multiplex ways S0 to S15 to which the blocks of the asynchronous communication are routed. The bits of the 16-bit words are applied respectively to second inputs of gates PA0 to PA15 (FIG. 3).

Figure 3:
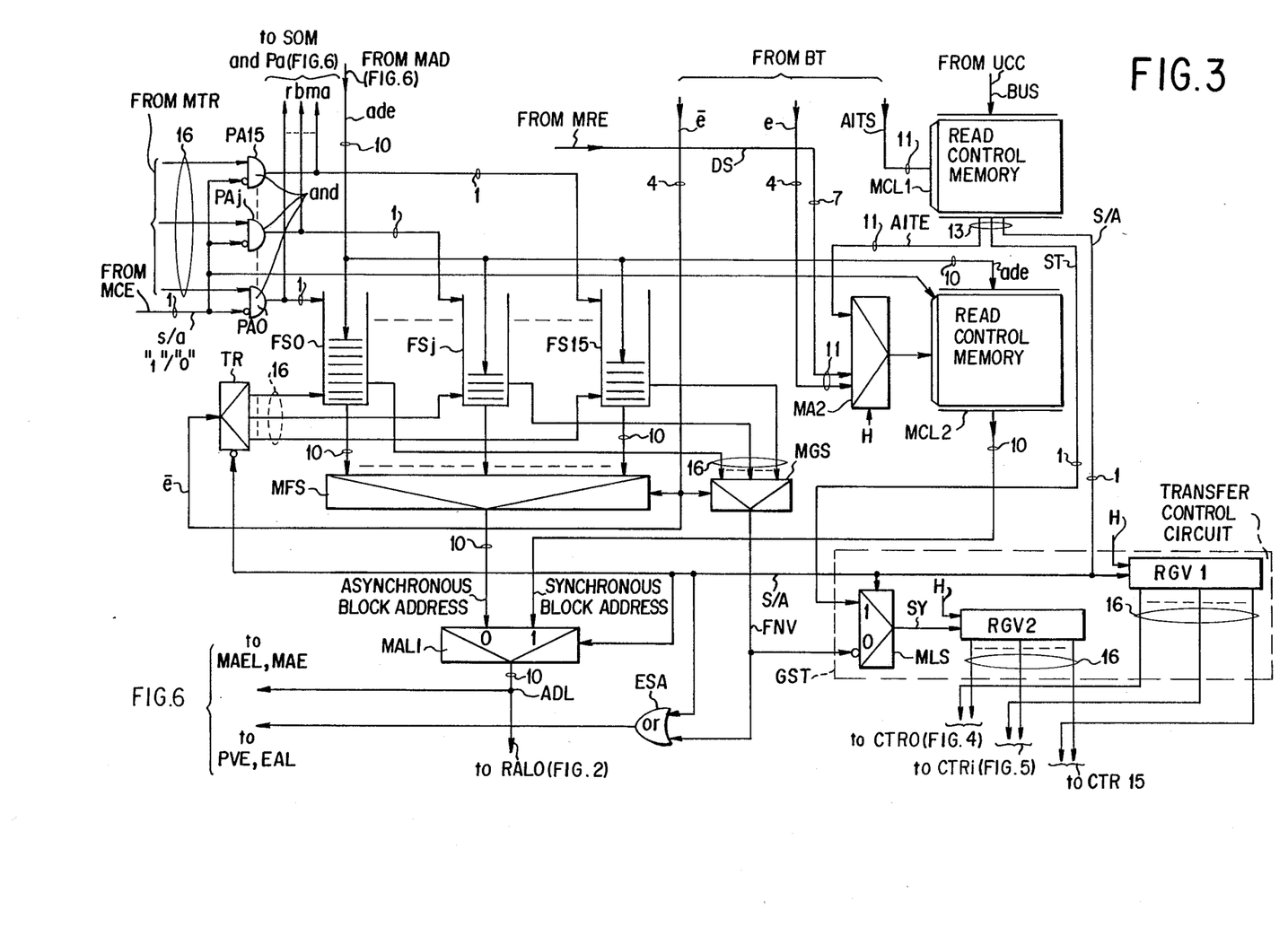
FIG. 3 is a detailed block-diagram of a buffer memory read addressing and control circuit, and a read-block transfer control circuit, both included in the hybrid system.

Now referring to FIG. 3, the read addressing and control circuit CAL contains sixteen FIF0 queues FS0 to FS15, a queue read enabling demultiplexer TR, the sixteen gates PA0 to PA15 for selectively authorizing writes in the queues, the first read control memory MCL1, a multiplexer MFS for the addresses read in the queues, a multiplexer MGS for selecting an empty queue, together with a transfer control circuit GST that comprises a two-input multiplexer MLS and two 16-stage shift registers RGV1 and RGV2, for reading frame synchronization blocks and blank blocks in the transfer circuits CTR0 to CTR15. All the circuits indicated above have functions similar to those shown in FIG. 2 in the French patent application No. 87-02892. Nevertheless, circuit CAL furthermore comprises a second read control memory MCL2, an address multiplexer MA2 for memory MCL2, and a block read address multiplexer MALI.

The first read control memory MCL1 contains at least $16 \times 69 = 1104$ usable 13-bit cells which are cyclically read during each frame period in response to the 11-bit words AITS supplied by the time base. Each word AITS identifies firstly the rank of an outgoing multiplex way S0 to S15 corresponding to the 4-bit word e; and secondly 7 other bits having ranks representing the time interval to be occupied by a block in the outgoing multiplex way. Each of the cells in memory MCL1 contains one 11-bit word AITE identifying the 4-bit rank of the incoming multiplex way and the 7-bit rank of the time interval in this multiplex that is occupied by an incoming block whose first octet should be read in buffer sub-memory MT0 at the time corresponding to the read addressing of the cell by the corresponding word AITS. In other words, memory MCL1 correlate, for each frame period, the address AITS of a time interval of an outgoing multiplex way i.e., an octet address in an outgoing bus F0 to F15 of one of the buffer sub-memories MT0 to MT15, to the address AITE of a time interval of an incoming multiplex way, i.e., the address of an incoming octet in an incoming bus D0 to D15 of one of the buffer sub-memories, this incoming octet having to be read when addressing the time interval of the outgoing multiplex way. As already stated, memory MCL1 is linked through bus BUS to the switching control unit UCC so as to write the addresses of the incoming time intervals contingent on these different correspondences between the incoming and outgoing time intervals, and hence the addresses are written as a function of the routings of the communications detected when setting up communications. The read addresses of the incoming time intervals AITE are applied to first inputs of multiplexer MA2.

With each address of incoming time interval AITE, there is derived a bit S/A indicating whether the block contained in the incoming time interval is asynchronous, S/A="1", or synchronous, S/A="0". In addition there is derived a synchronization enabling bit ST which is at state "1" only when the associated read address AITS corresponds to a synchronization block of outgoing multiplex frame these bits are written, in the corresponding cell of memory MCL1. Thus sixteen cells in memory MCL1 contain a bit ST at state "1", the other cells in memory MCL1 contain a bit ST at state "0". The outgoing block bits S/A read from memory MCL1 are successively applied to an inhibition input of demultiplexer TR, to a selection input of multiplexer MALI, to a selection input of multiplexer MLS, to a serial input of shift register RGV1 and to a first input of a two-input OR gate ESA. An output of gate ESA is linked to first inputs of an OR gate PVE and AND gate EAL included in circuit CAE (FIG. 6). Bits ST read from memory MCL1 are successively applied to a direct data input of multiplexer MLS.

The second read control memory MCL2 also contains at least 1104 cells. Each cell of memory MCL2 contains a 10-bit word identifying an address ade of a cell in buffer sub-memories MT0 to MT15 where an incoming block is written. The addresses ade are transmitted to memory MCL2, in the same way to write address register RAE0 (FIG. 2), by an available cell address memory MAD included in circuit CAE (FIG. 6). Memory MCL2 is addressed by multiplexer MA2, by firstly writing during each first octet half-period an incoming block 11-bit address transmitted by both link e of time base BT and outgoing bus DS from rotation memory MRE, in a similar manner to read addressing of memory MCE (FIG. 2); during each second octet half-period the memory is read by an incoming time interval address AITE read in memory MCL1. The write addresses e+DS applied to multiplexer MA2 form incoming time interval addresses that are permanently arranged according to the cyclic and constant order of the time-division multiplexing of the incoming intervals in matrix MRE, incontrast the addresses AITE read from memory MCL1 depend on the switching to be implemented and are completely disordered.

Thus memory MCL2 ensures an address conversion, i.e., a correspondence between the rank of an incoming time interval in the frame of multiplex ways D0 to D15 and the address of the cell of buffer memory MT in which the incoming block occupying the incoming time interval is written. Because the buffer memory cells are not assigned to predetermined incoming time intervals, or to the incoming multiplexes, it is necessary, while a block is written, particularly a; synchronous block, to memorize the address ade of the buffer memory cell memorizing this incoming block. Thus, this address ade is written into memory MCL2 in response to rank e+DS of the incoming block, and is read from memory MCL2 in response to the rank of the outgoing time interval AITE which is to be occupied by the incoming block; the rank causes incoming block rank AITE to be read into memory MCL1. In practice, the memorization of the buffer memory cell addresses in memory MCL2 is only used for the synchronous blocks and is enabled by bits s/a="1" delivered by memory MCE (FIG. 2) and applied to a write enabling input of memory MCL2. The buffer memory cell read addresses for the asynchronous incoming blocks are managed by queues FS0 to FS15, as descirbed in French patent application No. 87-02892 and referred to hereafter.

Queues FS0 to FS15 are FIFO ("First-In, First-Out") type, and have data inputs connected to the 10-wire output bus of the available cell address memory MAD delivering the cell write addresses ade. Write control inputs of queues FS0 to FS15 are connected respectively to outputs of addressing gates PA0 to PA15, whereas read control inputs of the queues are connected respectively to the sixteen outputs of the multiplexer TR that receives the words e from time base BT, via the inverter circuit INV. 10-wire buses outgoing from queues FS0 to FS15 are applied to inputs of multiplexer MFS and are selected by the words ē received on the selection input of multiplexer MFS. The 10-wire output bus from memory MCL2 and the 10-wire output bus of multiplexer MFS are connected respectively to first and second inputs of the cell read address multiplexer MALI and are selected by bits S/A read in memory MCL1. The output bus of multiplexer MALI delivering read addresses ADL of buffer memory cells is connected to the inputs of the first read address register RAL0 (FIG. 2) and to second inputs of two address multiplexers MAEL and MAE included in circuit CAE (FIG. 6). Empty condition outputs of queues FS0 to FS15 are connected respectively to sixteen inputs of multiplexer MGS and are selected by the words ē applied to four selection inputs fo multiplexer MGS. The output of multiplexer MGS supplies a bit FNV at state "1" corresponding to a non-empty queue selected by words ē. Bit FNV is transmitted to a second input of the OR gate ESA and to a data inverting input of multiplexer MLS. The output of multiplexer MLS is connected to the serial input of the second shift register RGV2.

The write and read operations of queues FS0 to FS15 are similar to those described in U.S. Pat. No. 4,603,416 and more precisely in the French patent application No. 87-02892. Queue FSj is assigned to the outgoing multiplex way Sj so as to: (a) store the addresses ade of the cells of buffer memory MT in which asynchronous blocks are written and assigned to multiplex way Sj, and (b) to read these addresses, at a rate of one address every sixteen octet periods on average this enables the written blocks to be read as long as the queue contains at least one address. As already stated, because memory MCL2 is used to read synchronous blocks, writing and reading of a queue are only authorized when (a) the corresponding bit s/a applied to the inverting inputs of AND gates PA0 to PA15 has a zero state and (b) the corresponding bit s/a applied to the inhibit input of demultiplexer TR and to the selection input of multiplexer MALI has a zero state. During a write operation, queue FSj stores a new address ade when the bit of rank j in the 16-bit words supplied by the translation memory MTR is a state "1", simultaneously with occurrence of a the new label of the asynchronous block to be written. This operation enables AND gate PAj which is one of gates PA0 to PA15. Then address ade of the cell in which the asynchronous block was written, is read from queue FSj in response to a word ē equal to binary coded number j, as expressed by a "1" only at the output of demultiplier TR connected to the read input of queue FSj. The read addressing cycle of the queues depends on the complementary words ē corresponding to the addresses of the outgoing multiplex ways decreasing from 15 to 0 to enable "de-diagonalization" of output rotation matrix MRE details of matrix MRE are illustrated in FIGS. 6 and 7 of the U.S. Pat. No. 4,603,416. According to the number of cell addresses contained in the queue FSj, the address of the asynchronous block just written is read practically immediately or offline. The read cell address is then transmitted to the second inputs of register MALI in order to read the block itself.

It is observed that the addresses ade written in the queues are not supplied cyclically by time base BT, as in the French patent application No. 87-02892, but by the buffer memory managing and write addressing circuit CAE thereby optimizing the memorization time of the blocks in the buffer memory.

Once sixteen octet periods multiplexer MGS, signals the condition of queues FS0 to FS15 to insert a blank block in outgoing multiplex ways S0 to S15 when the corresponding queues are empty, with the exception of the time intervals corresponding to the insertion of the outgoing synchronization blocks indicated by bits ST="1". The different insertions of the blank and synchronization blocks are made in transfer circuits CTR0 to CTR15 under the control of circuit GST.

Figures 4, 5:
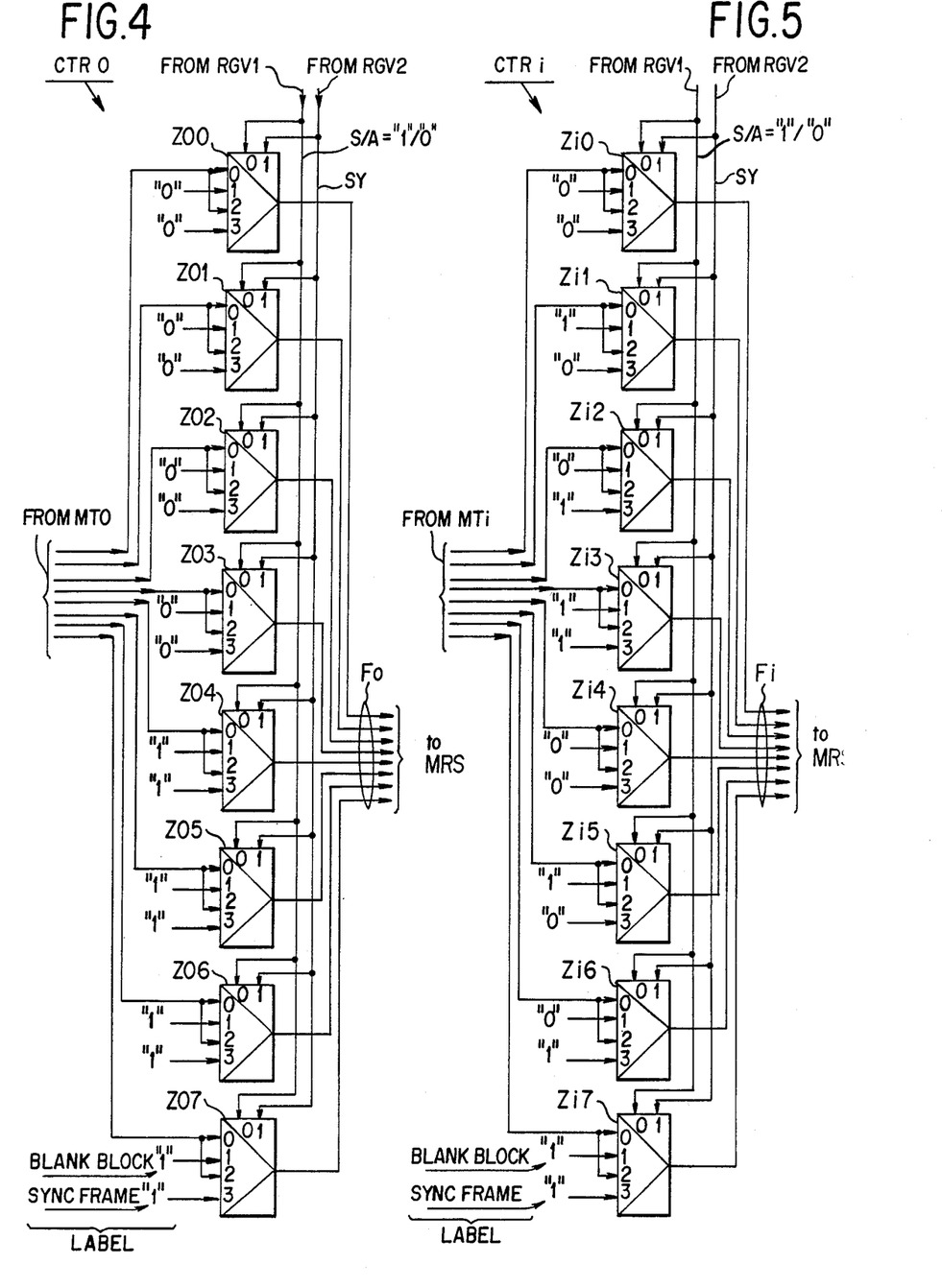
FIG. 4 is a detailed block diagram of a first transfer control circuit relating to first octets in read blocks and interconnected between the buffer memory and an output rotation matrix in the hybrid system.
FIG. 5 is a detailed block diagram of another transfer circuit in detail.

As shown in FIG. 4, transfer circuit CTR0 includes eight multiplexers Z00 to Z07 having first and third parallel data inputs receiving respectively bits of rank 0 to 7 in the first octets of the outgoing blocks from buffer sub-memory MT0. In the same way, each of the other transfer circuits CTR1 to CTR15 (such as circuit CTRi, FIG. 5, where i varies from 1 to 15) includes eight parallel multiplexers $Zi0$ to $Zi7$ having first and third data inputs receiving respectively the bits of rank 0 to 7 in the rank-i octets of the outgoing blocks from buffer sub-memory MTi. Second and fourth data inputs of the multiplexers included in transfer circuits CTR0 to CTR15 are connected to two wired read-only-memories, which store the patterns of a blank block and a frame synchronisation block, respectively. Thus in transfer circuit CTR0, the second and fourth inputs of multiplexers Z00 to Z03 are at state "0", and the second and fourth inputs of multiplexers Z04 to Z07 are at state "1" in accordance with the labels of blank and synchronization blocks "00001111". In the other transfer circuits, such as circuit CTRi, the second inputs of multiplexers $Zi0$, $Zi2$, $Zi4$ and $Zi6$ are at state "0", and the second inputs of multiplexers $Zi1$, $Zi3$, $Zi5$ and $Zi7$ are at state "1" in accordance with the filling octets "01010101" of a blank block, whereas the fourth inputs of multiplexers $Zi0$, $Zi1$, $Zi4$ and $Zi5$ are at state "0", and the fourth inputs of multiplexers $Zi2$, $Zi3$, $Zi6$ and $Zi7$ are at state "1" in accordance with synchronization octets "00110011".

As shown in FIG. 3, registers RGV1 and RGV2 included in transfer control circuit GST receive respectively the bits S/A and synchronization bits SY, the latter being derived by multiplexer MLS. The sixteen parallel outputs of register RGV1 are connected respectively to first selection inputs of the multiplexers in the transfer circuits CTR0 to CTR15, and the sixteen parallel outputs of register RGV2 are connected respectively to second selection inputs of the multiplexers in circuits CTR0 to CTR15. Bits S/A and SY are shifted in registers RGV1 and RGV2 by one stage in response to an octet clock pulse H, to an 8-wire input bus F0 to F15 of matrix MRS bits S/A and SY control successive transfers of the sixteen octets of a block for sixteen octet periods H.

The transfers of the four types of block, i.e., "asynchronous" blocks (such as packet-mode blocks and blank blocks), and "synchronous" blocks (such as circuit-mode blocks and synchronization blocks), are governed according to table I below:

TABLE I

|  | FNV | ST | multiplexers Z inputs | selections 0 S/A | 1 SY |
|---|---|---|---|---|---|
| packet | 1 | x | 0 | 0 | 0 |
| blank block | 0 | x | 1 | 0 | 1 |
| circuit | x | 0 | 2 | 1 | 0 |
| sync. frame | x | 1 | 3 | 1 | 1 |

In table I, an "x" may be a "1" or "0". Thus a blank block is transferred to an output when at a selection time "e"=j of an outgoing multiplex Sj, queue FSj is empty and S/A is at state "0", whereas a frame synchronization block is transferred to the outgoing multiplex way Sj when memory MCL1 delivers bits S/A="1" and ST="1" subsequent to a read address AITS="j".

Now referring to FIG. 6, the buffer memory managing and write addressing circuit CAE basically comprises a cell release memory MLC and an available cell address memory MAD. Memories MLC and MAD include respectively 1024 4-bit cells and 1024 10-bit cells which are respectively assigned to monitoring the 1024 one-octet sub-cells of buffer sub-memory MT0, and more generally, the 1024 cells of 16 sub-cells in memory MT, i.e., 1024 data block cells.

For each buffer memory block cell, the respective cell in memory MLC memorizes the updated number of times which a data block written in the buffer memory cell should be read. Initially, when the data block is written-in, the cell of memory MLC stores the number of outgoing multiplex ways to which the block should be transmitted, then each time this block is read, the stored number is decremented by unity until it reaches zero so as to release the buffer memory cell for writing another block via memory MAD, as will be seen later.

As shown in FIG. 6, memory MLC is associated with, to a summator-encoder SOM and a numbers multiplexer MNB to initially store the outgoing multiplexed numbers associated with the written blocks, as well as a circuit DEC and a zero test circuit TZ for said multiplex numbers so as to modify said numbers. Memory MLC is also associated with other multiplexers and logic gates for suitable write and read addressings contingent on the write and read times of the buffer memory cells notably.

The first inputs of multiplexer MNB receive the outgoing multiplexed 4-bit numbers nbms associated with the synchronous blocks to be written and supplied from the write control memory MCE (FIG. 2). Four second inputs of multiplexer MNB are connected to the outputs of summator-encoder SOM having sixteen inputs connected respectively to the outputs of queue write addressing gates PA0 to PA15. The selection input of the number multiplexer MNB receives the bits s/a transmitted by memory MCE. The four outputs of multiplexer MNB are connected to the four data inputs of the release memory MLC, via first inputs of a multiplexer MD; these inputs are selected during first octet half-periods H/2. When a synchronous block is to be written in buffer memory, the number nbms of outgoing multiples ways to which the synchronous block is to be transmitted, is selected in multiplexer MNB by s/a="1" and written in memory MLC. When an asynchronous block is to be written in buffer memory, the number nbma of outgoing multiplex ways to which the asynchronous block is to be transmitted, is deduced in summator-encoder SOM, from the sum of bits "1" supplied by the outputs of gates PA0 to PA15 write addressing queues FS0 to FS15 associated with said outgoing multiplex ways. The number nbma is selected in multiplexer MNB by s/a="0" and is written in memory MLC.

To write such a number of outgoing multiplex ways, nbms of nbma, the write and read address multiplexer MAEL receives on first inputs, a block cell write 10-bit address ade supplied from outputs ACS+ALS of memory MAD and corresponding to an unoccupied block cell in buffer memory MT in which the data block is to be written. Such write addressing is performed during a first octet half-period; multiplexers MD and MAEL, like the two other multiplexers MBE and MAE in circuit CAE, have selection inputs responsive to the octet clock signal H supplied by time base BT.

The previous write is authorized in response to a signal from an initial write enabling means comprising the 4-input OR gate Ps, a 16-input OR gate Pa, and a multiplexer MXsa. The inputs of the OR gate Ps receive the 4-bit numbers read in the write control memory MCE. Gate Ps applies a "1" to a first input of multiplexer MXsa when the outgoing multiplex number nbms for a synchronous block is at least equal to "1". The inputs of the OR gate Pa are connected respectively to the outputs of gates PA0 to PA15 (FIG. 3) In consequence gate Ps applies a "1" to a second input of multiplexer MXsa when at least one of the gates PA0 to PA15 write addresses a queue, as occurs when the outgoing multiplex ways number nbma for the synchronous block read in the translation memory MTR is at least equal to 1. The first and second inputs of multiplexer MXas are selected by the states of bits s/a, "1" and "0", respectively. The output of multiplexer MXsa is connected to a first input of OR gate PVE whose output is connected to a write enabling input of memory MLC. Thus the numbers nbms and nbma at least equal to 1, as read from memories MCE and MTR, are written in memory MLC, respectively when s/a="1" and s/a="0".

During a read, operation the release memory MLC is addressed by 10-parallel bit read address ADL transmitted by the output of multiplexer MALI (FIG. 3) and applied to the first inputs of multiplexer MAEL. This read address ADL of buffer memory block cell is equal to the write address of the same block ade and is transmitted each time the previous written block has to be read, such a read being reiterated contingent on the updated corresponding number nbma of the outgoing multiplex ways.

The number of outgoing multiplex ways nbm read from memory MLC is firstly decremented by unity in decrement circuit DEC. Circuit DEC has: (a) four inputs connected to the data outputs of memory MLC, (b) four number outputs connected to the inputs of an OR gate OAL and test circuit TZ, and (c) a sign output connected to a reset input of circuit TZ. Four outputs of circuit TZ are connected to the data inputs of memory MLC via second inputs of multiplexer MD. Subsequent to the decrementation of the number nbm read in memory MLC, circuit DEC transmits the binary code number (nbm-1) together with a sign bit SIG. In test circuit TZ, the sign bit SIG equal to "1" or to "0" when (nbm-1) is positive or negative, is compared to "0". If SIG="1", the number (nbm-1) which is greater than or equal to zero is not modified and is written in the cell of memory MLC having address ADL; such a write is effected if the write block in buffer memory is read again, or is read for the last time; this write is authorized through the OR gate ESA (FIG. 3) connected to the second input of the OR gate PVE, in response to a read synchronous block for which S/A="1" or to a read asynchronous block for which the corresponding queue is not empty. It is noted that address ADL is also used as a write address of the number (nbm-1). If SIG="0", the number (nbm-1) is equal to −1, and the test circuit re-writes in memory MLC the number nbm=0; this means that the number read nbm was already equal to zero so that, no previously written block is to be subsequently read in the buffer memory cell with address ADL.

The available cell address memory MAD forms a circuit for memorizing the buffer memory-MT block cell conditions and for deriving free cell addresses ADL. The memory MAD basically includes a matrix of 1024 one-bit cells and a buffer memory cell address encoding circuit. The cells of the matrix are respectively assigned to the block cells of buffer memory MT. Each matrix cell memorize one availability condition bit of the respective cell of the buffer memory. The condition bit is at high state "1" when the buffer memory cell is free and is thus ready to store a data block from an incoming multiplex way. The condition bit is at low state "0" when the cell of the buffer memory is occupied by a written data block which is to be read one or several times. The determination of whether the data block is to be read once or several times is contingent on the respective updated number, nbms or nbma, memorized in memory MCL. The encoding circuit in memory MAD is connected to the outputs of all the cells of the matrix so as to select one of the cells of the matrix having a condition bit "1", according to a predetermined cell priority order, and thus permanently derive the address of a free matrix cell selected equal to the write address ade of the respective block cell of the buffer memory.

The condition bits are transmitted to a data input DE of all the matrix cells in memory MAD by an inverting output of multiplexer MBE. The matrix cells are write-addressed by multiplexer MAE whose outputs are connected to 10 write address inputs ACS+ALS of a double column and row decoder of the matrix included in memory MAD. Each write operation is authorized by a "1" bit applied to a write enabling input ECR of memory MAD by a two-input OR gate PAE. A first input of OR gate PAE and a first input of multiplexer MBE are connected to the output of multiplexer MXsa. A second input of gate EAL is connected to an output of the AND gate EAL having an inverting input that is connected to the output of the OR gate OAL and to a second input of multiplexer MBE, having a direct input that is connected to the output of OR gate ESA (FIG. 3). As already stated, the first ten inputs and the second ten inputs of the write address multiplexer MAE are connected respectively to outputs ACS+ALS of memory MAD and to the outputs of multiplexer MALI (FIG. 3).

The first inputs of multiplexer MBE and the write authorization gate PAE receive a bit "1" through multiplexer MXsa. During a first octet half-period H/2, when a data block is to be written in a free cell of buffer memory MT having address ade supplied by outputs ACS+ALS from memory MAD (regardless of the respective number, nbms or nbma, written in memory MLC and hence the output condition of gates OAL and EAL), if the number nbms for synchronous block read from memory MCE is at least equal to 1, or if at least one of the sixteen bits representing the number nbma for asynchronous block read in memory MTR is at state "1". The address ade then addresses the respective cell in the matrix of memory MAD via multiplexer MAE to write a new "0" condition bit in this cell, via the first input of multiplexer MBE. Subsequent to this write operation, outputs ACS+ALS deliver a new free cell address for a future data block to be written.

As long as the respective number nbms or nbma which is decremented on each read of the data block does not reach zero, the gate EAL remains closed, and no change in the condition bit in the respective matrix cell of memory MAD occurs. In fact gate PAE remains closed, although an address ADL of this cell is applied to the second inputs of multiplexer MAE.

During a second octet clock period H/2, when the respective number nbms or nbma read and decremented in circuit DEC reaches zero, subsequent to a last read of the data block, the output of gate OAL switches to state "0", In response to the output of gate OAL switching to zero, gate EAL and applies a "1" state bit to input DE of memory MAD via the second input of multiplexer MBE. This "1" state bit is written in the respective cell of the matrix addressed by address ADL that is transmitted via the second inputs of multiplexer MAE. This write operation is enabled by the direct input of gate EAL being at state "1" and hence by the second input of gate PAE being at state "1", when S/A="1" for a synchronous block, or when the respective queue FS0 to FS15 is not empty, which is expressed by FNV="1". The "1" condition bit indicating the non-occupation of the cell having address ADL and just released is not modified until the selection thereof by the encoding circuit in memory MAD for the writing of another data block in buffer memory MT.

Although the above description refers to a hybrid switching system switching synchronous and asynchronous blocks, such a system, or a simplified similar system, can be only used to switch synchronous blocks, or else asynchronous blocks, whereas the multiplex ways carry synchronous blocks or asynchronous blocks only.

In a system for switching synchronous blocks only, memory MTR and queues FS0 to FS15 together with associated circuits PA0 to PA15, TR, MFS, MGS, and the circuits having inputs selected by bits s/a and S/A can be eliminated. Knowing that on average, the memorization time of a synchronous block between its write time triggered by its rank e+DS and its last read time controlled by address AITS of the corresponding outgoing time interval is less than a half-frame period, the capacity of buffer memory MT can be reduced by half, i.e., $(64/2)\times 16 = 512$ block cells.

In a system for switching asynchromous data blocks only, memory MCE and memory MCL2 together with associated multiplexer MA2 and the circuits having inputs selected by bits s/a and S/A can be eliminated. For address queue lengths having a capacity of 64 10-bit addresses, (as this number can be less than the number of blocks per frame in a multiplex) maximum addressing of $(64\times 16) = 1024$ asynchronous blocks (designed for 16 outgoing ways S0 to S15 during a frame), offers a very low probability. In practice, the capacity of the buffer memory may then be reduced by a factor of at least 4, i.e., a capacity of $(64/4)\times 16 = 256$ block cells, whilst preserving a capacity of 64 10-bit addresses per queue.

Naturally these different reductions in buffer memory capacity are envisaged because of to the memory cell release process implemented by the buffer memory managing and write addressing circuit CAE (FIG. 6).

Finally, according to other embodiments, when the switching system switches synchronous and/or asynchronous data blocks only for point-to-point communications, corresponding to numbers nbms and nbma being always equal to 1, the release memory MLC and associated circuits Ps, Pa, SOM, MNB, MD, PVE, MAEL, DEC, TZ, OAL and EAL are eliminated.

What we claim is:

1. A system for switching data blocks between a plurality of incoming multiplex ways and a plurality of outgoing multiplex ways, each of said blocks in said incoming ways being intended for at least one addressee of said outgoing ways, said system comprising input means (CE, MRE) for detecting data blocks in said incoming multiplex ways thereby multiplexing detected blocks into multiplexed blocks, buffer means comprising block cells for memorizing said multiplexed blocks, write addressing means (MCE, MTR, CPE) deriving write addresses of block cells for writing said multiplexed blocks in block cells in accordance with the derived write addresses, read addressing means (CAL) for arranging the addresses of the write addressed block cells dependent on addressee outgoing multiplex ways for which the written blocks are intended for cyclically reading the written blocks into read blocks in accordance with the arranged block cell addresses, and means (CTR, MRS, p/s) for demultiplexing said read blocks and transmitting them onto said addressee outgoing multiplex ways, said write addressing means comprising means (MAD) for selecting any one of the block cells which is free in said buffer means responsive to any data block being detected, thereby providing a free cell address to write said detected block in said buffer means, said free cell address being selected contingent on block cell addresses which are supplied from said read addressing means to said selecting means when memorized blocks are read.

2. The system claimed in claim 1, wherein at least a data block in an incoming multiplex way is transmissible to several addressee outgoing multiplex ways in predetermined number (nbm), and wherein said write addressing means comprises means (MCE, SOM) for indicating a variable number of outgoing multiplex ways to which said data block memorized in a buffer means cell is still to be transmitted, said variable number being initially equal to said predetermined number of addressee outgoing multiplex ways when said block is initially written in a cell of said buffer means, and means (MLC, DEC, T2) for decrementing said variable number by unity in response to each address (ADL) of said cell supplied from said read addressing means, for thereby releasing said cell as soon as said variable number reaches zero and thereby signalling this released cell to said selecting means (MAD).

3. A system for switching synchronous data blocks and asynchronous data blocks between plural incoming multiplex ways and plural outgoing multiplex ways, each of said incoming and outgoing multiplex ways including frames, each of said frames having a first time interval occupied by a synchronization block, other time intervals occupied sporadically by asynchronous data blocks, and predetermined time intervals occupied periodically by synchronous data blocks, each of said blocks in said incoming ways being intended for at least one addressee of said outgoing ways, said system comprising input means (CE, MRE) for detecting said synchronization, asynchronous and synchronous blocks in said frames of said incoming multiplex ways for thereby retransmitting asynchronous and synchronous multiplexed blocks, first memory cells for memorizing said synchronous multiplexed blocks, second memory cells for memorizing said asynchronous multiplexed blocks, output means (CTR, MRS, p/s) for demultiplexing synchronous and asynchronous blocks read in said first and second cells and for transmitting them into said respective addressee time intervals in said outgoing multiplex ways, write means (BT, MCE, MTR) for deriving block cell addresses for thereby writing each of said asynchronous and synchronous multiplexed blocks into a first memory cell and a second memory cell in accordance with the derived write addresses, first reading means (BT, MCL1, MCL2) receiving said addresses of said first memory cells in which are written said synchronous multiplexed blocks for reading said memorized synchronous blocks, by correspondence between said addresses of said first memory cells in which said synchronous blocks are written and at least identification numbers of addressee outgoing multiplexed time intervals to be occupied by said synchronous blocks, and several second read means (FT, FS0 to FS15) respectively assigned to said outgoing multiplex ways and addressed by said write means, said second read means receiving said addresses of said second memory cells in which are written and memorized said asynchronous multiplexed blocks, and said second read means reading said memorized asynchronous blocks by correspondence between the addresses of the second memory cells in which asynchronous blocks are written and identification numbers of addressee outgoing multiplex ways, characterized in that each pair of said first and second memory cells constitutes a single block memory cell in a buffer memory that is capable of indifferently memorizing any one of said synchronous blocks and asynchronous blocks, and said write means comprises means (MAD) for selecting a write address (ade) of any one of the block memory cells which are free in said buffer memory, responsive to any data block being multiplexed, thereby providing a free cell address to write said multiplexed block, said free cell address being selected contingent on block memory cell addresses which are supplied from said first and second reading means when memorized synchronous and asynchronous blocks are read in said buffer memory respectively.

4. The system claimed in claim 3, wherein said selecting means includes a circuit having 1-bit cells respectively assigned to said block cells of said buffer memory for memorizing availability conditions, free and busy, of said buffer memory cells for thereby permanently deriving an address of the buffer memory free cell address contingent on said free conditions, means for writing said busy condition in a 1-bit cell corresponding to said selected free block cell address as soon as a detected data block is to be written into said buffer memory, said selected free cell address being memorized: (a) in said first read means in response to said data block to be written being a synchronous block, and (b) in said second read means assigned to addressee outgoing multiplex ways of said block and addressed by said write means in response to said data block being an asynchronous block, and means for writing said free condition in a 1-bit cell corresponding to an address of block cell where a data block is read for the last time and which is supplied: (a) from said first read means in response to said read data block being a synchronous block, and (b) from said second read means in response to said data block read being an asynchronous block.

5. The system claimed in claim 3, wherein said first read means comprises a first memory for memorizing identification numbers of time intervals occupied by said detected data blocks in said incoming multiplex ways thereby providing, during a frame period of outgoing multiplexed data blocks from said buffer memory, said time interval identification numbers arranged contingent on identification numbers of time intervals in said outgoing multiplex ways to be occupied respectively by said read data blocks, and a second memory in which are written said addresses of buffer memory cells in which are written said asynchronous blocks, contingent on identification numbers of time intervals of these blocks in incoming multiplex ways provided by said input means, and in which are read said cell addresses contingent on said identification numbers of the arranged time intervals provided by said first memory.

6. The system claimed in claim 3, wherein at least a data block in an incoming multiplex way is transmissible to several addressee outgoing multiplex ways in predetermined number (nbm), and wherein said write means comprises:

means for updating numbers of outgoing multiplex ways to which data blocks memorized in said buffer memory are still to be transmitted, respectively, said variable number being initially equal to a predetermined number of addressee outgoing multiplex ways when said block is initially written in a cell, and means for decrementing said variable number by unity in response to each read address of said cell supplied from said first read means for thereby releasing said cell as soon as said variable number reaches zero and thereby signalling this released cell to said selecting means.

7. The system claimed in claim 6, wherein said updating means comprises a number memory having number cells respectively assigned to said block cells of said buffer memory for memorizing said updated numbers, means for writing said predetermined addressee multiplex way number relating to a selected free cell in said buffer memory while a data block is written in said cell, means for reading said updated number relating to a buffer memory cell in response to the address of the cell supplied from said first read means while a synchronous block is read in said cell and from said second read means while an asynchronous block is read in said cell, means for decrementing said read updated number by unity in response to the supplied address of said cell, said number being decremented until it reaches zero subsequent to a plurality of decrementations equal to the respective predetermined number, means for writing said read updated number after each of the decrementations in the number cell assigned to said buffer memory cell, and means connected to said decrementing means for indicating to said selecting means a zero state of said updated number for thereby releasing said buffer memory cell in which said data block has been read a number of times equal to said respective predetermined number.

8. The system claimed in claim 3, wherein the number of block cells in said buffer memory is less than the product of the number of time intervals in a multiplex frame and the number of said incoming multiplex ways.

9. A system for switching data blocks between a plurality of incoming multiplex ways and a plurality of outgoing multiplex ways, each of said blocks in said incoming ways being intended for at least one addressee of said outgoing ways, said system comprising input means (CE, MRE) for detecting data blocks in said incoming multiplex ways thereby multiplexing detected blocks into multiplexed blocks, buffer means comprising block cells for memorizing said multiplexed blocks, write addressing means (MCE, MTR, CPE) deriving write addresses of block cells for writing said multiplexing blocks in block cells in accordance with the derived write addresses, read addressing means (CAL) for arranging the addresses of the write addressed block cells dependent on addressee outgoing multiplexes ways for which the written blocks are intended for cyclically reading the written blocks into read blocks in accordance with the arranged block cell addresses, and means (CTR, MRS, p/s) for demultiplexing said read blocks and transmitting them onto said addressee outgoing multiplex ways, said write addressing means comprising means (MAD) for selecting one of the block cells which is free in said buffer means in response to a data block being detected, thereby providing a free cell address to write said detected block in said buffer means, said free cell address being selected contingent on block cell addresses which are supplied from said read addressing means to said selecting means when memorized blocks are read, a data block in an incoming multiplex way being transmissible to several addressee outgoing multiplex ways in predetermined number (nbm), said write addressing means comprising:

means (MCE, SOM) for indicating a variable number of outgoing multiplex ways to which said data block memorized in a buffer means cell is still to be transmitted, said variable number being initially equal to said predetermined number of addressee outgoing multiplex ways when said block is initially written in a cell of said buffer means, and means (MLC, DEC, T2) for decrementing said variable number by unity in response to each read address (ADL) of said cell supplied from said read addressing means, for thereby releasing said cell as soon as said variable number reaches zero and thereby signalling this released cell to said selecting means (MAD).

* * * * *

UNITED STATES PATENT AND TRADEMARK OFFICE
CERTIFICATE OF CORRECTION

PATENT NO. : 4,884,264
DATED : November 28, 1989
INVENTOR(S) : Michel SERVEL et al It is certified that error appears in the above-identified patent and that said Letters Patent is hereby corrected as shown below:

On the title page, after "[75] Inventors:", the name of the third-named inventor should be changed form "Jo',uml/e/l Francois" to --Joël Francois--.

Signed and Sealed this

Fourth Day of February, 1992

Attest:

HARRY F. MANBECK, JR.

*Attesting Officer*     *Commissioner of Patents and Trademarks*